United States Patent [19]

Hong et al.

[11] 4,049,891

[45] Sept. 20, 1977

[54] COMPOSITIONS FOR FAST ALKALI-METAL-ION TRANSPORT

[75] Inventors: Henry Y-P Hong, Westford; John B. Goodenough, Cambridge, both of Mass.

[73] Assignee: Massachusetts Institute of Technology, Cambridge, Mass.

[21] Appl. No.: 697,803

[22] Filed: June 21, 1976

[51] Int. Cl.² .................... H01M 12/00; C01B 15/16; C01B 33/32
[52] U.S. Cl. .............................. 429/193; 204/195 S; 423/306; 423/332
[58] Field of Search ........................ 429/104, 193, 191; 423/327, 332, 567, 306; 252/62.2; 204/15, 195 S, 242

[56] References Cited

U.S. PATENT DOCUMENTS

| | | | |
|---|---|---|---|
| 3,663,294 | 5/1972 | Levine et al. | 429/193 |
| 3,719,531 | 3/1973 | Dzieciuch et al. | 429/193 |
| 3,736,186 | 5/1973 | Liang | 429/191 |

Primary Examiner—Donald L. Walton
Attorney, Agent, or Firm—Arthur A. Smith; Robert Shaw; Paul J. Cook

[57] ABSTRACT

Fast alkali-metal-ion transporters are provided having low resistivities and low-activation-energy mobilities at temperatures at which alkali metals are molten. The novel compounds promote alkali-metal-ion transport in three dimensions within their crystalline structure and have the general formula:

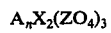

$$A_n X_2 (ZO_4)_3$$

or

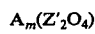

$$A_m (Z'_2 O_4)$$

wherein A is potassium, sodium or lithium, Z' is a tetrahedrally coordinated cation or mixtures thereof, X is an octahedrally coordinated cation or mixtures thereof, $n$ is a number greater than 1 and less than 4, $m$ is a number from 1 up to 2 and Z' is a mixture of at least two Z' cations.

8 Claims, No Drawings

COMPOSITIONS FOR FAST ALKALI-METAL-ION TRANSPORT

BACKGROUND OF THE INVENTION

The Government has rights in this invention pursuant to Contract No. NSF/RANN AER 74-02094 and IPA-0010 awarded by the National Science Foundation and pursuant to Contract No. F 19628-76C-0002 awarded by the Advanced Research Projects Agency, Department of the Air Force.

This invention relates to novel structures and compositions that provide fast alkali-metal-ion transport.

Prior to the present invention, $\beta$ and $\beta''$-alumina have been the solids with fastest sodium-ion transport; they have stimulated interest in their use as solid electrolytes for cells and thermoelectric generators as disclosed in U.S. Pat. No. 3,475,223. The best $\beta''$-alumina compositions have resistivities for sodium-ion transport at 300° C of about 4 ohm-cm and an activation energy for the mobility of about 0.16eV. Unfortunately, the volatility of soda together with the refractory nature of aluminum oxide has rendered production of ceramic membranes therefrom expensive. Furthermore, $\beta$- and $\beta''$-alumina are layer compounds in which the sodium ions are constrained to move in only two dimensions so that the confinement of sodium ions to widely separated layers sharply reduces the fraction of the membrane volume that transports sodium ions. Furthermore, the structure of $\beta$- and $\beta''$-alumina promotes anistropic thermal expansion so that the life of thermally cycled membranes made therefrom is reduced significantly.

Prior attempts to produce other crystalline materials that promote fast alkali-metal-ion transport have not met with success in that the activation energy and/or the resistivity have been too high for practical use. Thus, the class of crystalline aluminosilicate known as zeolites have been proposed because of their three-dimensional interstitial space but have been found not to promote fast alkali-metal-ion transport. In addition, the class of crystalline structures known as defect pyrochlores have to date been characterized by resistivities and activation energies too high to permit their practical use for fast alkali-metal-ion transport.

It would be highly desirable to provide crystalline compositions having rigid networks (or skeletons) with a three-dimensional interstitial space that promotes fast alkali-metal-ion transport. Furthermore, it would be desirable to provide such compositions that are also mechanically and chemically stable to the environments of use, such as cells utilizing liquid alkali metal and a reducing electrode or thermoelectric generators utilizing gaseous alkali metal.

SUMMARY OF THE INVENTION

The present invention is based upon the discovery that crystalline structures can be formed having rigid networks of corner-linked octahedra and tetrahedra or corner-linked tetrahedra that promote fast alkali-metal-ion transport in three dimensions and that exhibit good mechanical and chemical stability even in a molten alkali metal environment. These structures have a resistivity of less than about 100 ohm-cm. at the temperature where they are utilized. The class of crystalline compositions is represented by the formulae:

$$A_nX_2(ZO_4)_3 \quad \text{Formula I}$$

$$A_m(Z_2'O_4) \quad \text{Formula II}$$

wherein A is potassium, sodium or lithium; Z is a tetrahedrally coordinated cation or mixtures thereof not reducable by molten alkali metal; X is an octahedrally coordinated cation or mixtures thereof not reducable by molten alkali metal; $n$ is a number greater than 1 and less than 4; $m$ is a number from 1 up to 2 and Z comprises at least 2 Z cations. The compositions are characterized by a three-dimensional rigid structure of open networks formed from corner-shared oxygen tetrahedra or tetrahedra and octahedra through which the A+ ion can move in three dimensions. In addition, the minimum cross-sectional diameter of the interstitial space is about twice the sum of the atomic diameter of the anion and the mobile cation. Thus, the minimum cross-section diameter is about 5.4 A for potassium ions, 4.8 A for sodium ions and about 4.2 A for lithium ions and usually about 5.3 to 5.6 A for potassium, 4.8 to 5.4 A for sodium and 4.2 to 5.0 A for lithium respectively. The compositions of this invention are also characterized by having the lattice sites of the network interstitial space only partially occupied with alkali-metal ions to permit alkali-metal-ion transport within the crystal structure. If these sites were fully occupied by the alkali-metal-ion, there would be little or no alkali-metal transfer within the crystal structure. In addition, if the sites available to the alkali-metal ions are crystallographically inequivalent, the difference between the respective site-occupancy energies should be small and/or the number of mobile ions should be large enough to insure some occupancy of all types of sites available to them in order to minimize the activation energy of the mobility.

The compositions of this invention are useful as solid electrolytes in cells utilizing liquid alkali metals as a negative electrode wherein the composition comprises a membrane between the liquid metal and a positive electrode, such as liquid polysulfide impregnated with an electron conductor like carbon felt as in the NaS battery. The compositions also can be utilized as a solid electrolyte in a thermoelectric generator employing a differential pressure of alkali-metal ions maintained across the membrane formed of the composition. In addition, a membrane of these compositions can be utilized to extract selectively alkali-metal ions from alkali-metal salts such as KCl, NaCl or LiCl.

DESCRIPTION OF SPECIFIC EMODIMENTS

In the formulae, $A_nX_2(ZO_4)_3$ and $A_m(Z'_2O_4)$, representative suitable cations for X are $Ta^{5+}$, $Zr^{4+}$, $Hf^{4+}$, $In^{3+}$, $Ga^{3+}$, $Al^{3+}$, $Ca^{2+}$, $Mg^{2+}$ or the like and mixtures thereof. Representative suitable cations for Z and Z' are $Li^+$, $Mg^{2+}$, $Al^{3+}$, $Si^{4+}$, $P^{5+}$, $S^{6+}$ or mixtures thereof. Representative suitable crystalline compounds of this invention are:

$$Na_{1+x}Zr_2Si_xP_{3-x}O_{12} \quad \text{Formula III}$$

wherein $x$ is a number greater than 0 and less than 3 to form compounds such as $Na_3Zr_2Si_2PO_{12}$;

$$K_{2-2x}Mg_{1-x}Si_{1+x}O_4 \quad \text{Formula IV}$$

wherein $x$ is a number greater than 0 up to 0.5 such as $K_{1.9}Mg_{0.95}Si_{1.05}O_4$. In these compounds, the sum of the number of X—O and Z—O bonds per anion is 2 in order to obtain the desired three-dimensional lattice structure. In addition, polarization of the $O^{2-}$ ion charge density away from the $A^+$ cation is employed to increase the $A^+$ ion mobility. This is accomplished by forming strongly covalent $\pi$ and $\sigma$ X—O and Z—O bonds within the rigid network. For example, strongly covalent complexes such as $SO_4^{2-}$, $PO_4^{3-}$ or $SiO_4^{4-}$ or combinations thereof together with a transition-metal C cation having an empty d shell provides strong $\pi$ and $\sigma$ bonding in the network. Since it is desirable that the crystalline structure can be chemically stable against molten alkali metals, it is preferred to utilize $Zr^{4+}$, $Hf^{4+}$ and/or $Ta^{5+}$ as the transition-metal X ion in the structure. Although transition-metal X cations have been employed, nontransition-metal C ions are possible.

In contrast to the compositions of this invention, the known compound $NaZr_2(PO_4)_3$ has all of the sodium ions at only one of the crystalographically inequivalent positions available to the sodium ion and therefore has poor sodium-ion conductivity. The known compound $Na_4Zr_2(SiO_4)_3$ has all the available sodium sites occupied, and it too has poor sodium-ion conductivity.

The compositions of this invention are prepared by reacting the constituent reactants either in the solid or liquid state. The reactants utilized comprise the oxides and/or salts of the cations that are reducible to the oxides under the reaction conditions of temperature and pressure employed. In one representative procedure, the starting materials in particulate solid form are heated to a sintering temperature for a period of time to assure conversion to a product wherein the anions and the cations are bonded to oxygen atoms to form the tetrahedral or tetrahedral-octahedral crystalline structure. For example, the solid mixture is heated stepwise to decompose the least thermally stable reactant such as $NH_4H_2PO_4$ at about 170° C and then heating at an elevated temperature of about 900° C to decompose the $Na_2CO_3$ and then at a highly elevated temperature of about 1200° C to 1600° C to transform the reactants, which form the desired crystalline structure. The period of heating depends upon the amount of reactants with a representative time period being between about 4 hours and 24 hours. When forming a ceramic structure from the compositions of this invention, a flux material can be added to the reactants and reacted therewith by any means well-known in the art.

The following examples illustrate the present invention and are not intended to limit the same.

EXAMPLE I

This example illustrates the formation of the compound with the chemical formula $Na_{1+x}Zr_2Si_xP_{3-x}O_{12}$, wherein x ranges from 0.4 to 2.8.

Mixtures of $\frac{1}{2}(1+x)$ $Na_2CO_3$, $2ZrO_2$, $xSiO_2$ and $(3-x)$ $NH_4H_2PO_4$ wherein $0.4 \leq x \leq 2.8$ were heated to 170° C for about 4 hours to decompose $NH_4H_2PO_4$, then at 900° C for about 4 hours to decompose $Na_2CO_3$, and then at 1200° C for about 8 hours. The heated mixtures were then allowed to cool to room temperature. The compounds $Na_{1+x}Zr_2Si_xP_{3-x}O_{12}$, $0 \leq x \leq 3$, all had rhombohedral R3c structures, except in the range $1.8 \leq x \leq 2.2$ where a distortion to the monoclinic C2/c space group is found at room temperature. The structures of $NaZr_2P_3O_{12}$ and $Na_4Zr_2Si_3O_{12}$ were known prior to this invention.

In the $Zr_2Si_xP_{3-x}O_{12}^{(1+x)-}$ skeleton, a $Zr^{4+}$ octahedron shares its six corners with tetrahedra, and each tetrahedon shares its four corners with octahedra. Thus, each anion bonds strongly to a tetrahedral and an octahedral cation of the skeleton. In the rhombohedral phase, two $M^+$ ion sites (for the $Na^+$) are distinguishable in the interstitial space: close-packed-hexagonal $M_2$ layers in the basal plane connected by one-third as many $M_1$ sites between the $M_2$ layers. Thus, the interstitial space is connected in three dimensions, and the anion bottleneck (minimum cross section of interstitial space of skeleton) between the $M_1$ and $M_2$ sites consists of a puckered hexagonal ring having as its six sides alternately tetrahedral-site and octahedral-site edges of the skeleton. The monoclinic distortion distinguishes two $M_2$ sites: $3M_2 \rightarrow M_2 + 2M_3$. The jump distances for monoclinic $Na_3Zr_2Si_2PO_{12}$ lie in the range 3.51–3.8A.

Transport measurements were made on dense (in excess of 85% theoretical) polycrystalline ceramic disks approximately one-half inch in diameter and 0.05 to 0.1 inch thick. Ionic conductivity was measured with a ac vector-impedance meter (5 Hz to 500 kHz). Gold or platinum blocking electrodes, which permit electron transport but restrict ionic transport to a displacement current, were used to determine the electronic component. Nonblocking electrodes, consisting of a coating of colloidal graphite or both sides of the sample, permit $Na^+$-ion discharge from the electrolyte so that polarization at higher frequencies generally remains trivial to frequencies as low as 500 Hz. For comparison purposes, some dc and low-frequency ac measurements were made with $NaNO_3$ on both sides of the specimen.

In order to obtain dense ceramic disks of compositions in the system $Na_{1+x}Zr_2P_{3-x}Si_xO_{12}$, appropriate mixtures of $Na_2CO_3$, $ZrO_2$, $SiO_2$ and $NH_4H_2PO_4$ were heated for 4 hours at 170° C (to decompose the $NH_4H_2PO_4$) and calcined at 900° C for 16 hours. The product was cold-pressed at 80,000 psi after the addition of polyethylene glycol as a binder. The cold-pressed pellets were fired for 6 to 16 hours at temperatures of 1200° to 1400° C. The firing temperature of $Na_3Zr_2Si_2PO_{12}$, for example, was 1250° C, since at 1275° C there was appreciable decomposition of the specimen. Densities as high as 94% were obtained by this method. Transport measurements with blocking electrodes indicated a negligible electronic contribution, and prolonged immersion in molten sodium showed chemical stability in the environment. Table I lists the resistivities at 300° C for $Na^+$-ion transport as obtained with graphite electrodes at 1 kHz on ceramic disks more than 85% theoretical density. The activation energy for $Na_3Zr_2Si_2PO_{12}$ was found to be $\epsilon_a = 0.29$ eV.

The compound $NaZr_2P_3O_{12}$ has all the $M_1$ sites occupied by $Na^+$ ions while none of the $M_2$ sites are occupied by $Na^+$ ions. Since the $M_1$ and $M_2$ sites are not energetically equivalent, the resistivity of this compound is very high. Substitution of Si for P is charge compensated by the introduction of $Na^+$ ions on $M_2$ sites, which are linked to one another via $M_1$ sites. Therefore, so long as the $M_1$ sites remain occupied, $Na^+$ ion conductivity requires a correlated ionic motion: $Na_2^+ + Na_1^+ + \square_2 \rightarrow \square_2 + Na_1^+ + Na_2^+$, where the subscripts refer to sites $M_1$ and $M_2$ and the $\square$ represents an empty site. The fact that the lowest values of $\rho_{300}$° C occur where the rhombohedral axis of $c_r$ and cell volume are maximum is consistent with a maximum cross-section diameter for a minimum activation energy of the mobility. The fact that the crystal cell volume reaches a maximum with increasing x suggest that the electrostatic forces between $Na^+$ ions at adjacent $M_1$ and $M_2$ sites may actually displace Na+ ions toward bottleneck positions between the $M_1$ and $M_2$ sites, thus lowering the activation energy of the mobility for the correlated ionic motion.

At 300° C, the transport properties of $Na_3Zr_2Si_2PO_{12}$ are clearly equivalent to those of $\beta''$-alumina; they are superior at temperatures greater than 300° C, but inferior at temperatures less than 300° C. A much-improved preexponential factor is consistent with the three-dimensional character of the Na$^+$-ion transport in $Na_3Zr_2Si_2PO_{12}$. The $\beta''$-alumina has an activation energy less than 0.1 eV smaller than that of $Na_3Zr_2Si_2PO_{12}$.

The system, $Na_{1+x}Zr_2Si_xP_{3-x}O_{12}$, appears to be easier to fabricate into dense ceramics than $\beta''$-alumina. We have made both open and closed-ended tubes of $Na_3Zr_2Si_2PO_{12}$ at 90% theoretical density with preliminary extrusion/isostatic-pressing techniques.

The system, $Na_{1+x}Zr_2Si_xP_{3-x}O_{12}$ is only one representative of a class of compounds that can be stabilized with this basic structure. Ion exchange with Li$^+$ and K$^+$ ions has been successfully accomplished. Other ions can replace the octahedral Zr$^{4+}$ ions and the tetrahedral Si$^{4+}$ and P$^{5+}$ ions.

TABLE I

| Composition (X) | Structure | $\rho$ 300° C ($\Omega$—cm) | $\epsilon_a$ (eV) |
|---|---|---|---|
| 0.4 | R | 1867 | 0.26 |
| 0.8 | R | 341 | 0.31 |
| 1.2 | R | 38 | 0.27 |
| 1.6 | R | 21 | 0.32 |
| 1.8 | M | 8 | 0.24 |
| 2.0 | M | 5 | 0.29 |
| 2.2 | M | 6 | 0.24 |
| 2.4 | R | 9 | 0.26 |
| 2.6 | R | 28 | 0.24 |
| 2.8 | R | 56 | 0.24 |

The X-ray data for the compounds of the system $Na_{1+x}Zr_2Si_xP_{3-x}O_{12}$ are set forth in Table II.

TABLE II

| Composition | Space Group | a (A°) | b (A°) | c (A°) | | V (A°)$^3$ |
|---|---|---|---|---|---|---|
| $Na_{1.4}Zr_2Si_{0.4}P_{2.6}O_{12}$ | R$\bar{3}$c | 8.840(3) | | 22.731(9) | | 1538.3 |
| $Na_{1.8}Zr_2Si_{0.8}P_{2.2}O_{12}$ | R$\bar{3}$c | 8.898(1) | | 22.774(8) | | 1561.6 |
| $Na_{2.2}Zr_2Si_{1.2}P_{1.8}O_{12}$ | R$\bar{3}$c | 8.940(3) | | 22.855(9) | | 1581.9 |
| $Na_{2.6}Zr_2Si_{1.6}P_{1.4}O_{12}$ | R$\bar{3}$c | 8.980(5) | | 22.906(9) | | 1599.6 |
| $Na_{2.8}Zr_2Si_{1.8}P_{1.2}O_{12}$ | C2/c | 15.567(9) | 9.003(5) | 9.217(6) | 123.76(5) | 1610.8×2/3 |
| $Na_{3.0}Zr_2Si_2PO_{12}$ | C2/c | 15.586(9) | 9.029(4) | 9.205(5) | 123.70(5) | 1616.6×2/3 |
| $Na_{3.2}Zr_2Si_{2.2}P_{0.8}O_{12}$ | C2/c | 15.618(9) | 9.051(6) | 9.210(9) | 123.93(6) | 1620.6×2/3 |
| $Na_{3.4}Zr_2Si_{2.4}P_{0.6}O_{12}$ | R$\bar{3}$c | 9.079(2) | | 22.685(9) | | 1619.3 |
| $Na_{3.8}Zr_2Si_{2.8}P_{0.2}O_{12}$ | R$\bar{3}$c | 9.148(4) | | 22.239(9) | | 1611.6 |

EXAMPLE II

The compound of $Na_3Zr_2Si_2PO_{12}$ was ion exchanged with Li$^+$ or K$^+$ to replace Na$^+$ essentially 100% by immersing it in successive melts of LiNO$_3$ or KNO$_3$. The X-ray data are presented in Table III.

TABLE III

| Compound | Space Group | a(A°) | c(A°) | V(A°)$^3$ |
|---|---|---|---|---|
| $Li_3Zr_2Si_2PO_{12}$ | R$\bar{3}$c | 8.554(5) | 23.314(9) | 1477.4 |
| $K_3Zr_2Si_2PO_{12}$ | R$\bar{3}$c | 8.940(3) | 23.721(9) | 1641.8 |

EXAMPLE III

This example illustrates the formation of the compound $K_{2-2x}Mg_{1-x}Si_{1+x}O_4$, which has MgO$_4$ and SiO$_4$ tetrahedra linked by shared corners so that each oxygen atom is bonded by two skeletal cations to form a cubic network having an equivalent interstitial space displaced along a cubic axis by half a lattice parameter. Mixtures of $(1-x)K_2CO_3$, $(1-x)$MgO and $(1+x)SiO_2$ with $x$ ranging from 0 to 0.30 were heated at 1000° C for 16 hours and then allowed to cool to room temperature. Compounds were formed for $0 \leq x \leq 0.3$ and were tested for ionic mobility and resistivity in the manner set forth in Example I. The results for $x = 0.05$ are set forth in Table IV.

TABLE IV

| x | K$^+$ions/cc | $\epsilon_a$(eV) | $\rho$ 300° C($\Omega$—cm) |
|---|---|---|---|
| .05 | 16.4×10$^{21}$ | 0.35 | 28 |

I claim:

1. A crystalline compound which promotes fast alkali metal-ion transport in three dimensions having the formula selected from the group consisting of:

$$A_nX_2(ZO_4)_3$$

and $$A_m(Z'_2O_4)_3$$

wherein A is potassium, sodium or lithium, Z is a tetrahedrally coordinated cations or mixtures thereof not reducible by molten alkali metal, X is an octahedrally coordinated cation or mixtues thereof not reducible by molten alkali metal, n is a number greater than 1 and less than 4, m is a number from 1 up to 2 and Z' comprises at least two Z cations.

2. The compound of claim 1 of the formula:

$$Na_{1+x}Zr_2Si_xP_{3-x}O_{12}$$

wherein $x$ is a number greater than 0 and less than 3.

3. The compound of claim 1 wherein X is Zr$^{4+}$.
4. The compound of claim 1 wherein X is Ta$^{5+}$.
5. The compound of claim 2 wherein $x$ is 2.
6. The compound of the formula:

$$K_{2-2x}Mg_{1-x}Si_{1+x}O_4$$

wherein $x$ is a number greater than 0 and less than 0.5.

7. The compound of claim 6 wherein $x$ is 0.05.
8. The compound of claim 1 having the formula:

$$K_3Zr_2Si_2PO_{12}.$$

* * * * *